July 16, 1929.  R. H. BEAUMONT  1,721,479
DRAG SCRAPER
Filed Dec. 9, 1926  2 Sheets-Sheet 1
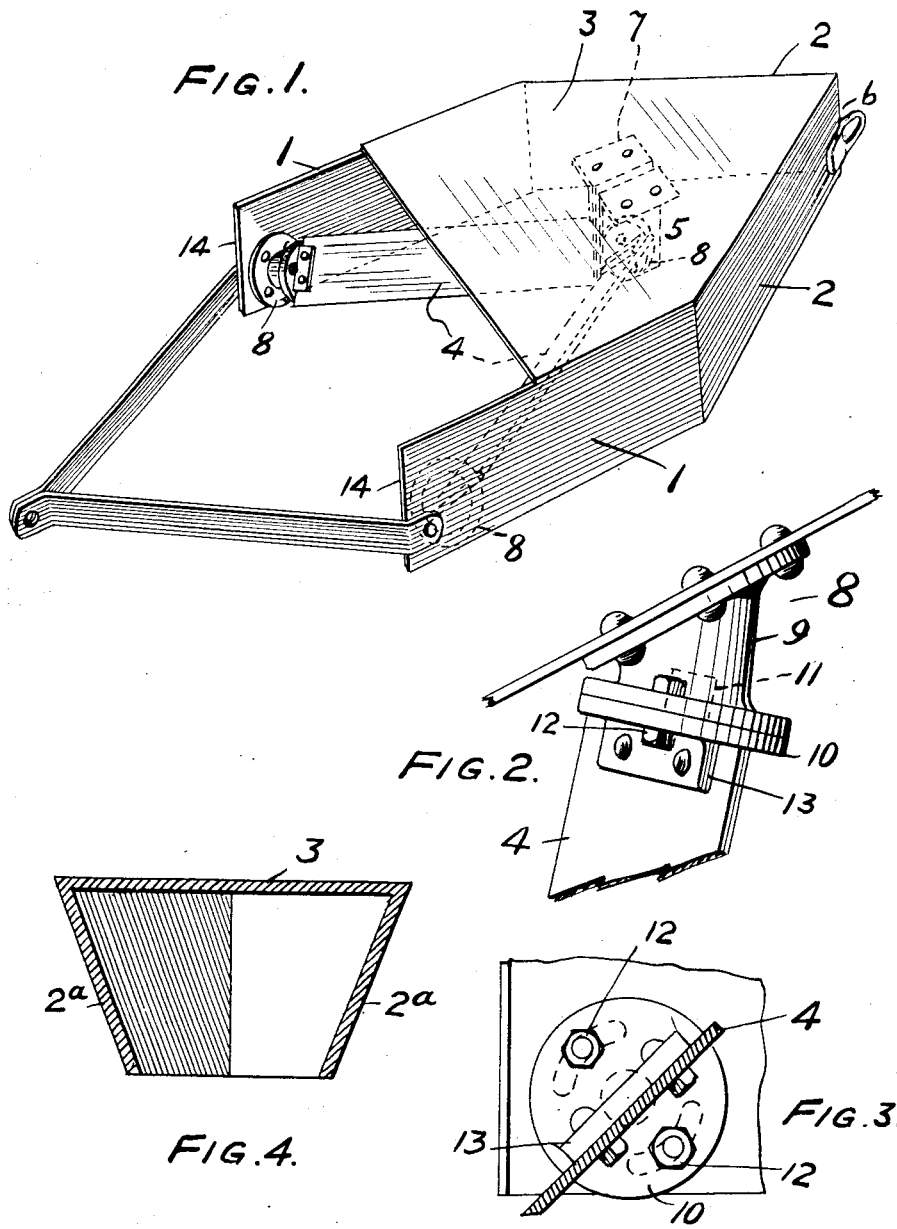
WITNESS:
INVENTOR
Robert H. Beaumont
BY
Augustus B. Stoughton,
ATTORNEY.

July 16, 1929.  R. H. BEAUMONT  1,721,479
DRAG SCRAPER
Filed Dec. 9, 1926  2 Sheets-Sheet 2

WITNESS:

INVENTOR
Robert H. Beaumont
BY
Augustus B Stoughton
ATTORNEY.

Patented July 16, 1929.

1,721,479

UNITED STATES PATENT OFFICE.

ROBERT H. BEAUMONT, OF RADNOR, PENNSYLVANIA, ASSIGNOR TO R. H. BEAUMONT COMPANY, OF PHILADELPHIA, PENNSYLVANIA, A CORPORATION OF PENNSYLVANIA.

DRAG SCRAPER.

Application filed December 9, 1926. Serial No. 153,532.

The principal objects of the present invention are to provide a drag scraper which can be readily adapted to work in hard or soft ground or material, and which will cut and dig efficiently and travel in a straight path in both, and which can be readily moved backward.

Other objects of the invention will appear from the following description at the end of which the invention will be claimed.

In the following description reference will be made to the accompanying drawing forming part hereof and in which Figure 1 is a perspective view of a drag scraper embodying features of the invention.

Fig. 2 is a top or plan view drawn to an enlarged scale of one of the fittings shown in Fig. 1.

Fig. 3 is an end view of Fig. 2, and

Fig. 4 is a section showing a modification and taken generally on a line corresponding to the line 4—4 of Fig. 5 and drawn to a somewhat enlarged scale.

Figure 5:
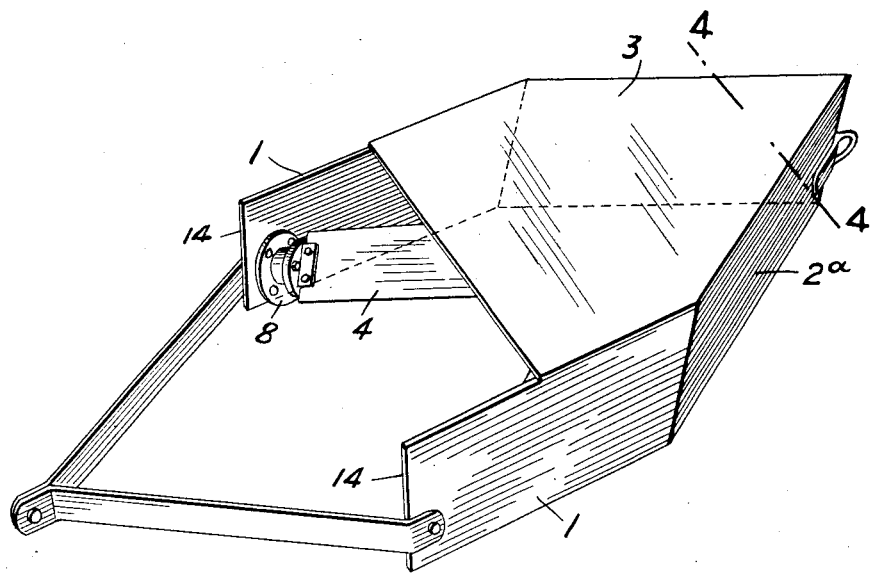
Fig. 5 is a perspective view of the modified form of drag scraper shown in Figure 4.

Referring to the drawing, more particularly Figs. 1 to 3, the side walls of the scraper are flat or plane throughout their extent, and they are parallel as at 1 at the front end of the scraper and they converge as at 2 to a point at the rear end of the scraper. 3 is a cover. 4 indicates plow plates flat or plane throughout their extent, and they are inclined inward from the top to the bottom edges thereof and they converge from the parallel portions 1 of the side walls to a point generally indicated at 5, spaced from the point generally indicated at 6 to which the portions 2 of the side walls converge. 7 is a bracket or plate depending from the cover and adapted to support the converging ends of the plow plates 4. There are fittings generally indicated at 8 in which the plow plates are turnable to adjust their inclination from the top to the bottom edges thereof. Each fitting comprises two members 9 and 10 having one of their faces in turnable contact with each other, and there is a pintle 11 and a slot and bolt and nut connection 12, so that the element 9 can be fixed to an appropriate part of the scraper, and the element 10 is connected by the provisions 13 with a plow plate 4, so that the latter can be turned and clamped in different positions.

The adjustment of the inclination of the plow plates 4 adapts them to cut or dig into hard or soft ground. The front edges 14 cut. The parallel portions 1 steer the scraper in a straight path, and the point at 6 facilitates backward movement of the scraper.

In Figures 4 and 5 there is shown a modification which differs from the construction which has been described only in that the converging portions of the side walls 2ª are inclined inward from the top to the bottom edges thereof.

I claim:

1. A drag scraper comprising side walls plane throughout their extent and parallel at the front end of the scraper and end walls converging to a point at the rear end of the scraper, a cover plate, plow plates plane throughout their extent and inclined inward from the top to the bottom edges thereof and converging from the parallel portions of the side walls to a point spaced from the first mentioned point, and a bracket depending from the cover and adapted to support the converging ends of the plow plates.

2. A drag scraper comprising side walls plane throughout their extent and parallel at the front end of the scraper and end walls converging to a point at the rear end of the scraper, a cover plate, plow plates plane throughout their extent and inclined inward from the top to the bottom edges thereof and converging from the parallel portions of the side walls to a point spaced from the first mentioned point, a bracket depending from the cover and adapted to support the converging ends of the plow plates, and fittings in which the plow plates are turnable to adjust their inclination from the top to the bottom edges thereof.

3. A drag scraper comprising side walls plane throughout their extent and parallel at the front end of the scraper and end walls inclined inwards from the top to the bottom edges thereof and converging to a point at the rear end of the scraper, a cover plate, plow plates plane throughout their extent and inclined inward from the top to the bottom edges thereof and converging from the parallel portions of the side walls to a point spaced from the first mentioned point, and a bracket depending from the cover and adapted to support the converging ends of the plow plates.

ROBERT H. BEAUMONT.